United States Patent [19]

Beckey

[11] Patent Number: 5,105,366
[45] Date of Patent: Apr. 14, 1992

[54] COMFORT CONTROL SYSTEM AND METHOD FACTORING MEAN RADIANT TEMPERATURE

[75] Inventor: Thomas J. Beckey, Edina, Minn.

[73] Assignee: Honeywell Inc., Minneapolis, Minn.

[21] Appl. No.: 518,110

[22] Filed: May 3, 1990

[51] Int. Cl.⁵ .............................. G01 13/00; F24F 3/14
[52] U.S. Cl. ..................... 364/505; 364/557;
374/109; 165/21; 236/91 C
[58] Field of Search ........... 364/505, 557, 550, 551.01;
374/109, 142; 165/11.1, 14, 21, 28, 22; 236/1 B,
91 C, 91 R, 91 F; 62/229

[56] References Cited

U.S. PATENT DOCUMENTS

| | | | |
|---|---|---|---|
| 4,095,740 | 6/1978 | Wirth | 236/47 |
| 4,227,645 | 10/1980 | de La Farge et al. | 165/11.1 X |
| 4,294,404 | 10/1981 | Gajjar | 236/49 |
| 4,403,296 | 9/1983 | Prosky | 374/109 X |
| 4,432,210 | 2/1984 | Saito | 364/557 X |
| 4,482,007 | 11/1984 | Yoshimi et al. | 165/21 |
| 4,502,290 | 3/1985 | Suzuki et al. | 62/229 |
| 4,623,969 | 11/1986 | Bensoussan et al. | 364/505 |
| 4,793,553 | 12/1988 | Berman | 236/91 R |
| 4,873,649 | 10/1989 | Grald et al. | 364/505 |
| 4,897,798 | 1/1990 | Cler | 364/505 |
| 4,916,642 | 4/1990 | Kaiser et al. | 165/22 X |

FOREIGN PATENT DOCUMENTS 3300389 7/1984 Fed. Rep. of Germany .

OTHER PUBLICATIONS

Fanger, P. O. *Thermal Comfort* Robert E. Krieger Publishing Company, 1982, pp. 9-11, 140-142, FIG. 16.

Primary Examiner—Joseph L. Dixon
Attorney, Agent, or Firm—Charles L. Rubow

[57] ABSTRACT

A comfort control system and method which determines the operating temperature set point for the environment to be controlled, in part by indirectly measuring the mean radiant temperature of the environment. A temperature sensor and relative humidity sensor sense the environment to be controlled and provide electrical signals indicating the sensed values to a microprocessor. A building load monitor either monitors the duty cycle of the heating/cooling system for the environment or senses the difference between the environment temperature and the outside temperature to generate a value indicative of the heating or cooling load on the building. A calculation formula to be stored in the microprocessor factors the selected operating temperature, the building load, the relative humidity, and selected constance. The microprocessor determines the operating set point, compares the set point to the temperature of the environment, and generates a control signal for the heating/cooling system. A method of controlling the comfort of an environment comprises the steps of sensing the air temperature and relative humidity of the environment, monitoring the building load, accessing the selected temperature and selected constant values for use in an operating set point calculation formula, calculating the operating temperature set point, comparing the operating temperature set point with the sensed room temperature, and generating a control signal for the heating/cooling system based on the comparison.

14 Claims, 5 Drawing Sheets

COMFORT CONTROL SYSTEM AND METHOD FACTORING MEAN RADIANT TEMPERATURE

FIELD OF THE INVENTION

The present invention relates to a comfort control system and method, and in particular such a system and method which factors an approximated mean radiant temperature of the area to be controlled.

BACKGROUND OF THE INVENTION

The comfort of users of an area is a function of several variables, including the following:
1. The activity level of the users of the area;
2. The clothing worn by the users of the area;
3. Air movement in the area;
4. The humidity level in the area;
5. The air temperature in the area; and
6. The mean radiant temperature, which indicates the combined effect of all surface temperatures in a room as those factors effect the heat gain and/or loss of the users of the room.

These factors are discussed in the text *Thermal Comfort* by P.O. Fanger (Robert E. Krieger Pub. Co. 1982).

The above factors are indicative of the predicted mean vote (PMV), a measure of mean thermal sensation among a large group of people under similar conditions. Such a measure is used because different people will perceive the comfort level differently even under identical conditions. The first two factors, the activity level and clothing of the users, are typically independent of a control system for the area to be controlled. The last four factors may be directly affected by the control system operation.

Typical control systems do not take all four of these environmental factors into account. Sensing and adjusting for environmental factors other than $T_{mrt}$ will tend to increase the comfort level for an environment such as a room. For example, relative humidity may be sensed to adjust the thermostat set point to maintain the mean thermal sensation among users of a room. When a temperature of a room is held constant, the room may feel warmer when relative humidity increases. Control systems may automatically reduce the thermostat set point when relative humidity increases to compensate for the increase in the mean thermal sensation experienced by users of a room when relative humidity increases.

However, failure to measure $T_{mrt}$ may result in inappropriate modifications of the environment. For example, the relationship between increases in relative humidity and increases in the mean thermal sensation may be misinterpreted in some climate conditions. The mean radiant temperature may increase, leading to a higher mean thermal sensation. However, if the increase in $T_{mrt}$ is accompanied by a decrease in the relative humidity, the operating set point will increase in a $T_{mrt}$ independent system, leading to discomfort.

While it is desirable to sense the mean radiant temperature in the room and incorporate that value into the comfort control system, sensing the mean radiant temperature is difficult. The mean radiant temperature is a function of all the surface temperatures in a room. Thus, applying a temperature sensor to only one room surface will give only a partial indication of the mean radiant temperature for the room. Moreover, the $T_{mrt}$ is a function of the users' position within the room.

The Fanger text indicates that each surface temperature may be sensed, but that such a process requires a number of thermometers and a considerable amount of calculation work. $T_{mrt}$ may also be directly measured by use of a thermocouple or other temperature sensor inside a sphere. Such spheres are typically painted black. Copper spheres are used for their ability to spread temperature effects uniformly around the globe. However, copper spheres have a substantial time lag. Fanger suggested the use of a thin plastic bubble or balloon, but notes that spheres are generally unavailable on the market. Even when spheres are available, it may be difficult to locate the sphere in the room, especially without the sphere being quite noticeable. For some or all of these reasons, current control systems do not measure $T_{mrt}$. $T_{mrt}$ may be approximated through the use of thermometers without spheres. However, while temperature sensors may be placed to indicate a temperature which is a function of both the air temperature and the mean radiant temperature, such efforts tend to distort the mean radiant temperature.

SUMMARY OF THE INVENTION

The invention comprises a comfort control system which factors sensed values which allow approximation of the mean radiant temperature into the operating set point, even though the mean radiant temperature is not sensed directly. One embodiment of the system comprises a thermal sensor for generating an electrical signal indicative of the ambient temperature of a room; a relative humidity sensor for generating an electrical signal indicative of the relative humidity of the room; a building load monitor for generating an electrical signal indicative of the building heating or cooling load; microprocessor means electrically interconnected with the temperature sensor, the relative humidity sensor, and the building load monitor for storing the sensed and monitored values for temperature, relative humidity, and building load, storing selected values indicative of the programmed temperature set point, a building load constant, a relative humidity constant, and a relative humidity reference value, and processing the sensed and selected values stored in the storage means to derive an operating set point in accordance with an equation which factors in mean radiant temperature through the building load. In an alternative embodiment, the outside air temperature is sensed and processed to factor mean radiant temperature into the equation.

DETAILED DESCRIPTION OF THE DRAWINGS

Figure 1:
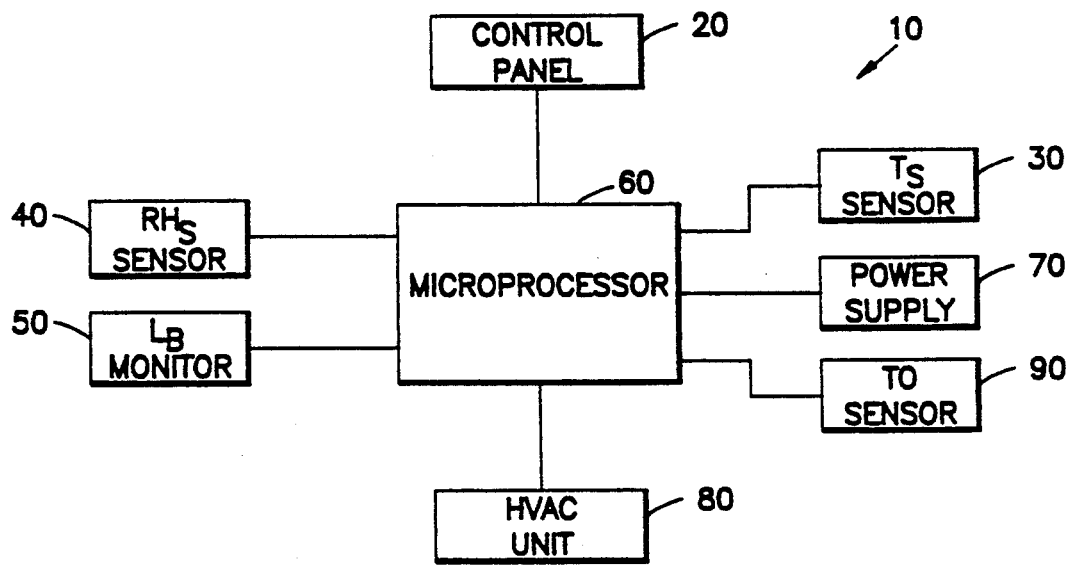
FIG. 1 is a block diagram showing a control system in accordance with the present invention.

FIG. 1 shows the elements of a control system 10 in accordance with the present invention. Although individual elements are separated in the Figure, it should be recognized that one or more elements of the system may be physically interconnected. The system includes a control panel 20. The control panel will typically have buttons or other input means which may be used to set the selected program temperature, $T_p$. The control system has other parameters which may also be set input at the control panel, as discussed below. The control panel is electrically interconnected with microprocessor 60.

The sensed room temperature $T_s$ is sensed by sensor 30. $T_s$ sensor 30 is electrically interconnected to microprocessor 60. The location of $T_s$ sensor 30 and the number of sensors may vary. Sensor 30 may consist of a single sensor that primarily senses the air temperature of the room or other environment to be controlled.

Alternatively, $T_s$ sensor 30 may be mounted in a position suitable for sensing both the air temperature and the temperature of one or more surfaces of the room. Since the mean radiant temperature $T_{mrt}$ is a function of the surface temperatures in a room, a sensor positioned to be responsive to the wall temperature will provide a sensor temperature reading which is a function of both the air temperature and the mean radiant temperature.

Alternatively, a number of sensors may be positioned in the room to obtain a more accurate air temperature reading or data which indicates the mean radiant temperature because more of the surfaces of the room are sensed. To increase the responsiveness of the control system to the actual user or users of the room, the temperature sensor may be placed in close proximity to the user or users or otherwise placed such that the temperature sensed is indicative of the temperature near the user or users. Temperature sensor 30 will provide an electrical signal to microprocessor 60 which is indicative of the sensed temperature. For purposes of this description it is assumed that the signal provided is converted into degrees Fahrenheit, although other temperature scales are also suitable.

The control system 10 also includes a relative humidity sensor 40. An electrical signal indicative of the relative humidity sensed by the sensor, $RH_s$ is provided by the sensor 40 to microprocessor 60.

In the preferred embodiment of the present invention, the mean radiant temperature $T_{mrt}$ is not directly sensed. Instead, other measurable characteristics of the environment to be controlled are measured which are indicative of $T_{mrt}$. In FIG. 1 $T_{mrt}$ is indirectly sensed by sensing the building load $L_b$ at monitor 50. $T_{mrt}$ is directly related to the exterior load of the building to be measured by monitor 50. For example, on a hot summer day when the control system is in the cooling mode, the mean radiant temperature will increase as the outside temperature increases, particularly in rooms with exterior surfaces. Similarly, the exterior building load will increase as the outside temperature increases. Conversely, on cold winter days when the system is in the heating mode, lower outside temperatures will reduce the mean radiant temperature of rooms with exterior surfaces, and the exterior building load will increase proportionately.

The exterior building load $L_b$ may be monitored in a variety of ways. For example, the duty cycle of the heating or cooling unit will typically bear a close relationship to the exterior building load. On hot summer days the cooling unit will give the highest duty cycle when the building load is greatest. The duty cycle is particularly suited for indicating building load in that building load is typically measured by a number between 0.0 and 1.0, and duty cycle is either defined with a similar scale or easily converted into a similar fraction or value between 0.0 and 1.0 by determining the ratio of the measured duty cycle divided by the maximum duty cycle. Also, the duty cycle is easily monitored because the control system will either send ON and OFF signals which will control the HVAC unit 80, send a duty cycle setting as discussed in connection with FIG. 3A, or otherwise have available information from which the building load may be determined. Microprocessor 60 will incorporate or have access to a clock (130 in FIG. 2) which will allow the microprocessor to measure and compare the time periods during which the system is on and off. Duty cycle D may be calculated from the measured on time $T_{on}$ and measured off time $T_{off}$ during which the system is on and off. Duty cycle D may be calculated from the measured on time $T_{on}$ and measured off time $T_{off}$ during a total period $T_{total}$ (equal to the sum of $T_{on}$ and $T_{off}$) by the following equation:

$$D = \frac{T_{on}}{T_{total}}$$

Alternatively, the exterior building load may be approximated by sensing and comparing the outside temperature $T_o$ and the sensed temperature $T_s$ inside the room or environment to be controlled. Generally, the greater the difference between $T_o$ and $T_s$ the greater the building load. The temperature-based measure of building load $L_b$ can be converted into a fraction between 0.0 and 1.0 by dividing the difference between $T_o$ and $T_s$ by a maximum value for the temperature difference, $\Delta T_{max}$.

FIG. 1 also shows power supply 70 for powering the control system. Also shown is the heating and cooling or HVAC unit 80, interconnected with the microprocessor 60 so that the microprocessor can provide signals to HVAC unit 80 to control the heating and/or cooling provided to the room or other environment to be controlled.

Figure 2:
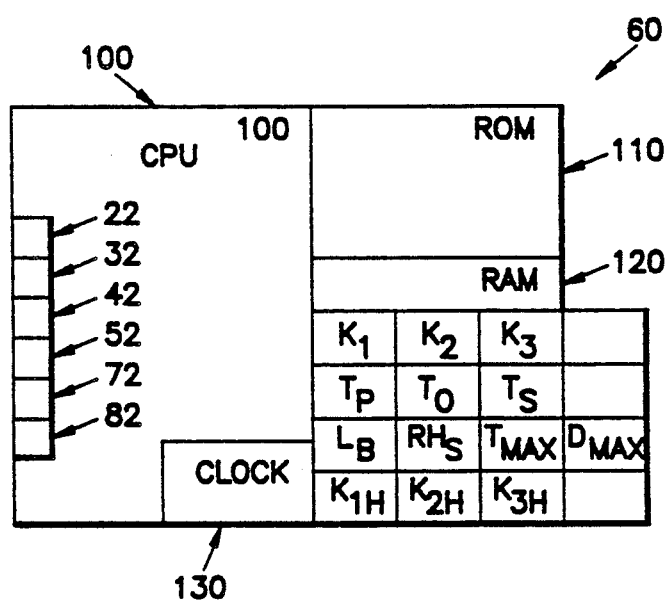
FIG. 2 is a block diagram showing the microprocessor portion of the control system.

FIG. 2 shows the microprocessor 60 in greater detail. The microprocessor includes the central processing unit or CPU 100, and memory accessible by the CPU 100 such as read only memory (ROM) 110 and random access memory (RAM) 120. The RAM 120 is suitable for storing the sensed values $RH_s$, $T_s$, and $L_b$. RAM 120 is also suitable for storing the selected operating temperature set at the control panel, $T_p$, as well as the constants which are employed in the control system algorithm. ROM 110 may be used to store a control program for controlling HVAC unit 80 or other components as necessary in response to processing of the sensed and stored values. The microprocessor 60 receives signals from the control panel 20, $T_s$ sensor 30, $RH_s$ sensor 40, and $L_b$ sensor 50 at ports 22, 32, 42, and 52, respectively. Alternatively, the microprocessor 60 may use greater or fewer ports and employ multiplexing or receive additional control signal lines from the sensors and/or the control panel. Also shown is port 72 for receiving power from power supply 70, and port 82 for providing a control signal to HVAC unit 80.

Figure 3A:
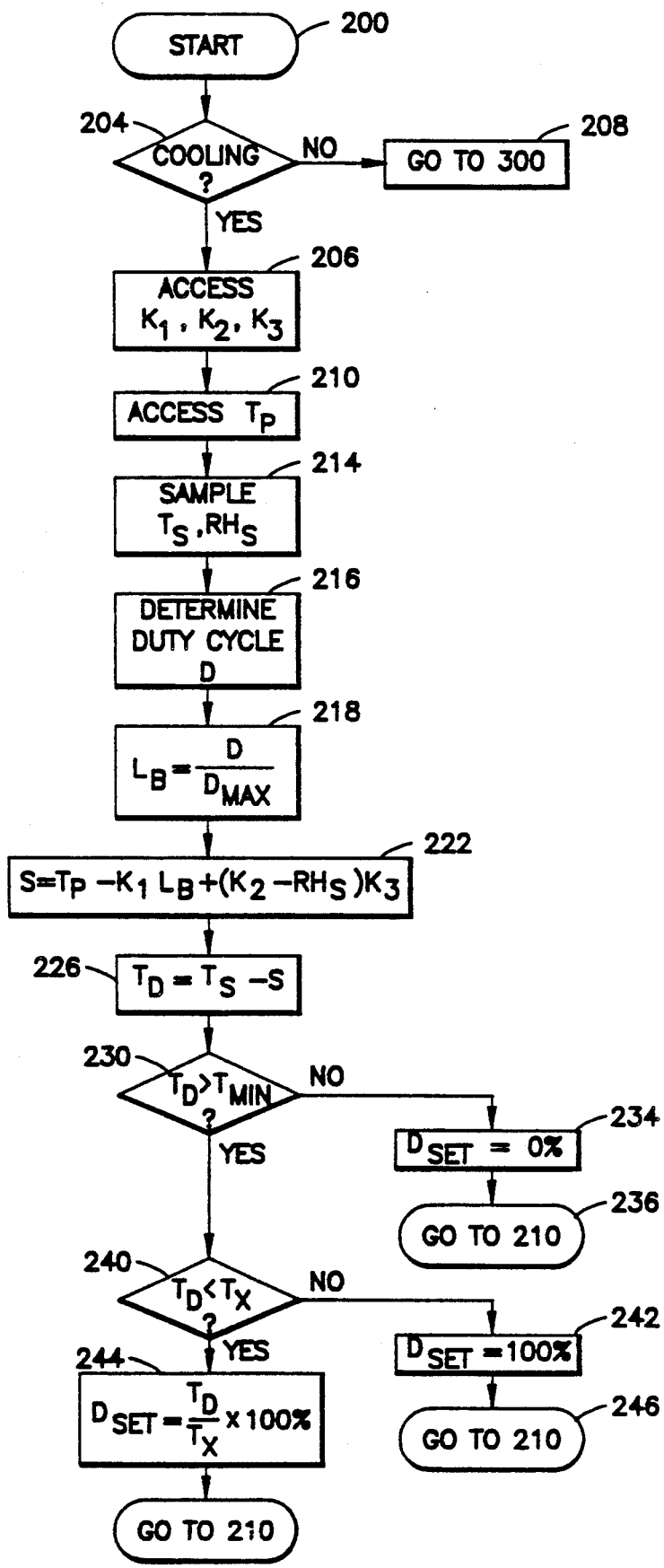
FIGS. 3A and 3B show process flow charts for a cooling system in accordance with the present invention.

The process by which the sensed and stored values are factored to set an appropriate operating set point will now be discussed in connection with FIG. 3A. FIG. 3A shows a control process flow chart describing the steps to be performed by CPU 100 through program software which may be stored in ROM 110.

At step 204, the system determines whether it is in heating or cooling mode. If it is in heating mode, the system will, as indicated at step 208, transfer to the heating program subroutine to be discussed in connection with FIGS. 4A and 4B. If the system is in cooling mode, it proceeds to step 206. Although the heating and cooling subroutines are generally similar, different subroutines may be required because of differences in the calculations of the operating set point. Whether the system is in cooling mode may be determined, for example, by a signal provided at control panel 20 by the user. Alternatively, a cooling-indicating signal may be provided under a predetermined set of conditions, such as dates and times, outdoor or indoor temperature, etc.

Once it is determined that the system is in cooling mode, the constants to be used for the cooling mode are accessed. These constants are shown at step 206 as being $K_1$, $K_2$, $K_3$. Typically these values will be stored in RAM 120.

The constants may be chosen by a variety of means. $K_3$, the relative humidity multiplier constant, may be selected based on the New Effective Temperature Scale (ET) which incorporates in part ASHRAE Comfort Standard 55-74. From this table, a value of 1°/10% may be appropriate for typical temperature ranges. Alternatively, the preferences of the particular users of the system based on testing or experience will dictate the appropriate $K_3$ setting. The relative humidity comparison constant $K_2$ and building load constant $K_1$ may also be selected based on empirical evidence or personal preference.

The programmed set point $T_p$ is accessed at step 210. $T_p$ may be preset and stored in RAM 120, or alternatively set or reset at control panel 20 and stored in RAM 120. The values provided by sensors 30 and 40 are sampled and stored in RAM 120 at step 214. These values include the sensed temperature $T_s$ and the sensed relative humidity $RH_s$. The duty cycle of the cooling system, D, may be determined at step 216 by calculating $T_{on}/T_{total}$ as described above.

If the sensed duty cycle D is not directly indicative of the value of the exterior building load $L_b$, $L_b$ must be determined. At step 218, $L_b$ is converted into a value between 0.0 and 1.0 by equating it to the ratio of D divided by the accessed constant value $D_{max}$ corresponding to the maximum D cycle which may be sensed by sensor 50. $D_{max}$ will be stored in RAM 120. However, in the preferred embodiment the step 216 of determining D will render a conversion from D to $L_b$ unnecessary because D will already have a value between 0.0 and 1.0.

The current operating temperature set point S is determined at step 222. The equation shown in step 222 is repeated below:

$$S = T_p - K_1 L_b + (K_2 - RH_s)K_3$$

As is readily seen from the above formula, the current operating set point is a function not only of the program set point $T_p$, but of the building load $L_b$ and the sensed relative humidity $RH_s$ as well. The interrelation of these values will be more clear with the use of particular values for the constants.

For example, let the building load constant $K_1$ equal 3° F. This setting of the building load constant means that, when the building load is at a maximum (1.0) the current operating set point will be reduced by 3° F. Also, let the relative humidity comparison constant $K_2$ equal 50%, and the relative humidity multiplier constant $K_3$ equal 1° F./10%. These values effect the operating set point equation such that a sensed relative humidity of 50% will result in no modification of the operating set point due to relative humidity, and that a sensed relative humidity of 40% will increase the current operating set point by 1° F. (50% − 40% = 10% and 10% × 1° F./10% = 1° F.). These suggested set points for the constants used in calculating the operating set point in the equation are generally indicative of the types of values that are appropriate for the equation. However, actual experience and testing in a given room or other environment may indicate that it is appropriate to set these constants at different values to increase the comfort of users using the room or other environment. Such different values may be present in ROM, or adjusted or reset at the control panel 20 and stored in RAM.

Once the operating set point S is determined at step 222, the HVAC unit may be appropriately controlled. A typical means of exerting such control is to provide the HVAC unit with a duty cycle $D_{set}$ at which it should operate, as discussed below. A temperature difference $T_D$ equal to the calculated set point subtracted from the sensed temperature for the room $T_s$ is calculated at step 226. If S is greater than $T_s$, $T_D$ will be less than a minimum value $T_{min}$, as determined at step 230. The room temperature is already sufficiently cool to set $D_{set}$ at a 0% duty cycle. Assuming that the constant values are not to be modified, the process is repeated by returning to step 210. Alternatively, if the difference $T_D$ exceeds a maximum value $T_x$, as determined at step 240, a constant cooling signal is needed and the duty cycle is set at 100% at step 242. The cycle is repeated as indicated at step 246. If $T_D$ is greater than $T_{min}$ but less than $T_x$, a proportionate duty cycle is calculated at step 244. For example, if $T_D = 1°$ F. and $T_x = 2°$ F., the duty cycle will be set at 50%. Other formulas for calculating the duty cycle may also be appropriate.

TABLE A shows a representative set of values for the time of day (Time), programmed temperature $T_p$, sensed temperature $T_s$, outdoor temperature $T_o$, the difference between $T_s$ and $T_o$, the determined building load $L_b$, the sensed relative humidity $RH_s$, and calculated current operating set point S. The values shown are calculated using the constant values for $K_1$, $K_2$, and $K_3$ as specified above (3° F., 50%, and 1° F./10% respectively).

As indicated by Table A, the current operating set point(s) will vary above or below the programmed set point of 78° ($T_p$) throughout the course of a typical summer day to reflect changes in the building load and the relative humidity in the controlled environment. For example, at 10:00 a.m., Table A indicates an outside temperature of 77° and relative humidity of 50%. At that temperature and relative humidity, there will be no building load, corresponding to an approximated mean radiant temperature which equals the programmed temperature of 78° F. Thus, the operating set point will not be reduced at all due to the approximated mean radiant temperature. Moreover, because the relative humidity at 10:00 a.m. is equal to the referenced relative humidity of 50%, no adjustments will be made due to the relative humidity either, and the current operating set point will equal the program set point of 78° F.

At 3:00 p.m., the outside temperature indicated in Table A is 88° F. That figure suggests a relatively high mean radiant temperature. The high outdoor temperature may cause the air conditioner to run at its maximum duty cycle, generating a building load factor $L_b$ of 1.0. Also, at 3:00 p.m. the relative humidity inside the room is reduced to 35%. Using the set point equation, the building load value $L_b$ of 1.0 causes the current operating set point to be reduced 3° while the lower relative humidity $RH_s$ causes an offsetting increase in the current operating set point of 1.5° F. The net effect of both the mean radiant temperature (approximated by using the building load $L_B$) and the relative humidity is to reduce the operating set point 1.5°, from 78° F. to 76.5° F. Since this temperature is lower than $T_s$, the duty cycle of the HVAC unit will increase. At 6 p.m. in Table A, S is greater than $T_s$, and the HVAC unit duty cycle is set at 0%.

Figure 3B:
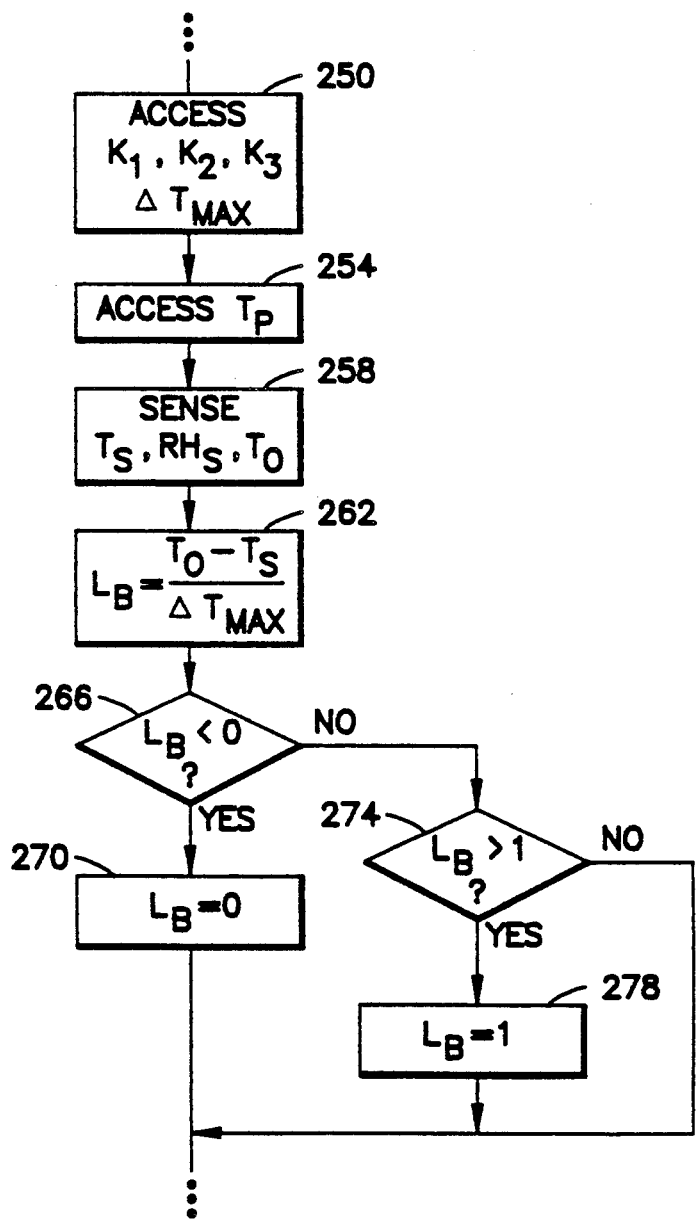

FIG. 3B shows a portion of the process flow chart used with a cooling system having an alternative means of calculating the building load factor $L_b$. The steps shown in FIG. 3B may replace steps 206–218 in FIG. 3A.

The primary difference between the method of calculating $L_b$ in FIG. 3B and the method described in FIG. 3A is that in FIG. 3B $L_b$ is calculated using the outside air temperature $T_o$ rather than the duty cycle D. As indicated at step 250, constants $K_1$, $K_2$, and $K_3$ are the same as in FIG. 3A. However, in FIG. 3B the fixed value indicating the maximum temperature difference $\Delta T_{max}$ is accessed.

Steps 250 and 258 are similar to steps 210 and 214 described in FIG. 3A except that the value sensed by $L_B$ monitor 50 is a factor of the outside temperature $T_o$ instead of the duty cycle D. In step 262, $L_b$ is calculated as equal to the ratio of the difference in the outside and sensed temperatures $(T_o - T_s)$ divided by $\Delta T_{max}$. Since, even in the cooling mode, the outdoor temperature may be lower than the indoor sensed temperature, step 266 is included to determine whether such a condition exists. If it exists, $L_b$ is set to 0 at step 270 to avoid having a negative value for the building load. Alternatively, it is possible that the difference between the outside or the indoor sensed temperature may be larger than the constant value $\Delta T_{max}$. If such is the case, as determined at step 274, $L_b$ will be reduced to its maximum value of 1.0 at step 278. The process continues with step 222 as shown in FIG. 3A.

Figure 4B:
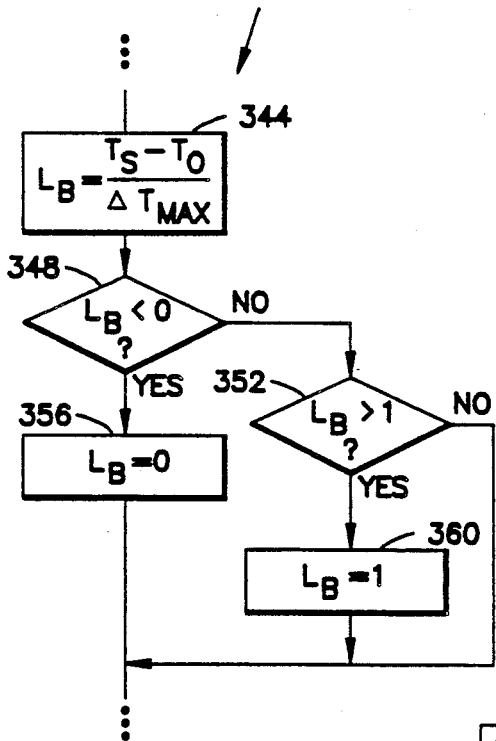
FIGS. 4A and 4B show process flow charts for a heating system in accordance with the present invention.
Figure 4A:
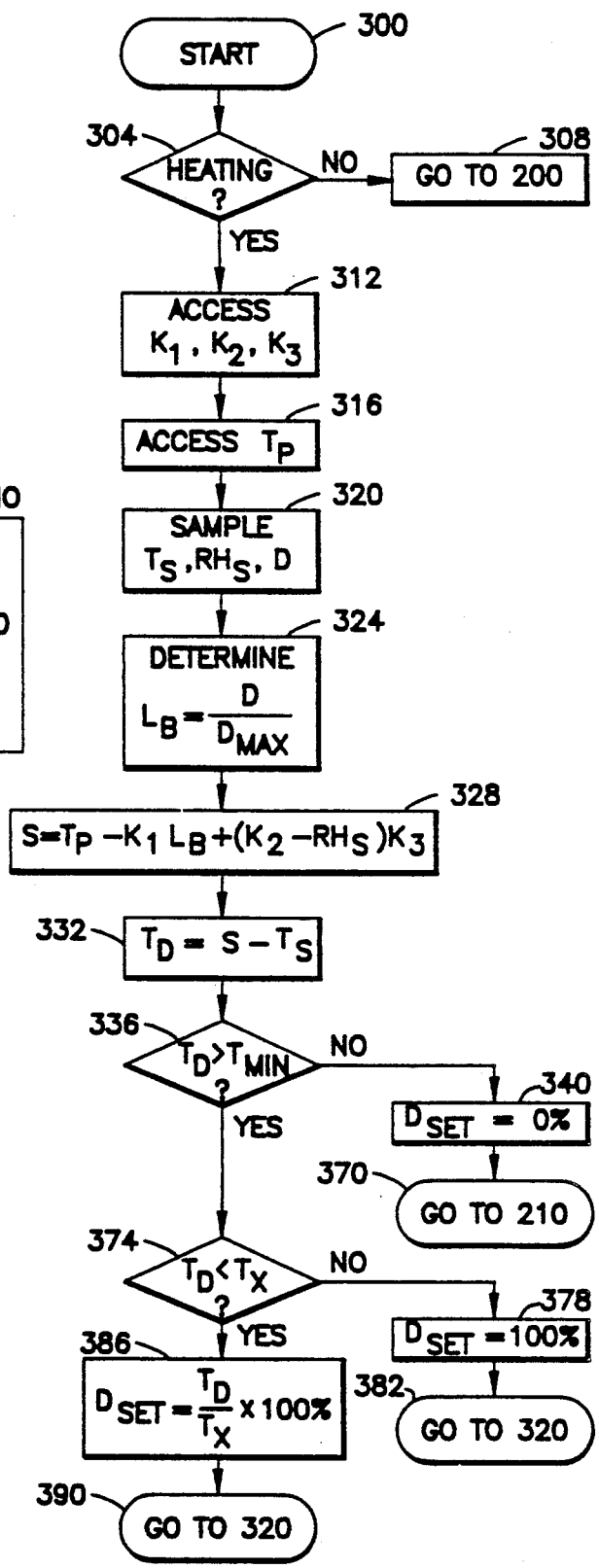

FIGS. 4A and 4B show process flow charts for a heating system in connection with present invention. The steps generally parallel the steps described with respect to the cooling system shown in FIGS. 3A and 3B. However, the constant values $K_1$, $K_2$, and $K_3$, may be different for the heating mode than the corresponding values for the cooling mode. Moreover, the values used to calculate the building load $L_b$, such as $\Delta T_{max}$, may be different for the heating mode than for the cooling mode. The selected programmed temperature $T_p$ is set at step 316. The sensed values $T_s$, $RH_s$, and D are sampled at step 320, and $L_b$ calculated (if necessary) at step 324.

Step 328 shows the operating set point equation, which is similar to the equation used for the cooling mode. However, since a higher building load indicates that the mean radiant temperature is relatively lower on cold days, the load factor constant $K_1$ is a negative number. Thus, as building load increases in heating load, the operating set point will also increase.

Step 332 shows the calculation of temperature difference $T_D$, equal to setpoint S minus sensed temperature $T_s$. As discussed relative to FIG. 3A, the duty cycle is set at 0% if $T_D$ is less than a minimum value $T_{min}$ at steps 336, 340, and 370. If $T_D$ exceed a maximum value $T_x$, the duty cycle is set at 100% as shown at steps 374, 378, and 382. If $T_D$ is greater than zero and less than $T_x$, a proportionate duty cycle is calculated at 386. This activation system is one example of how the HVAC unit may be regulated.

FIG. 4B shows the alternative means of calculating the heating building load $L_b$ incorporating a comparison of the outside temperature $T_o$ and the sensed room temperature $T_s$. In this equation, the outside temperature $T_o$ is subtracted from the temperature $T_s$ at step 344, unlike the numerator used for the $L_b$ determination in step 262 of FIG. 3B for the cooling mode. Step 348, 352, 356, and 360 in FIG. 4B insure that the building load fact $L_b$ is maintained at a value between 0.0 and 1.0, similar to steps 266, 270, 274, 278 of FIG. 3B. The steps shown in FIG. 4B may be inserted in place of step 324 at FIG. 4A. The values accessed at steps 312 and 320 will be modified, if necessary, to reflect the use of temperature values rather than duty cycle values.

The comfort control equation described herein is a first-order equation. Additional experience or testing may indicate that a different formula more accurately reflects the desirable temperature set point. Such a formula may be a second-order or other equation. Such variations are within the spirit of the present invention.

Altering the above system and process may also take into account the effect of air movement on the comfort of users of a room or other environment. In general, air movement has a cooling effect on users of a room. Moreover, in general, air movement will increase as building load increases, since the heating or cooling unit will generate more air flow when they are used more. This effect may be taken into account, for example, by modifying the building load constant $K_1c$. In the cooling mode, $K_1$ might have a slightly smaller value (e.g. less than 3° F.) to account for the cooling effect of air movement which automatically accompanies an increase in building load. In the heating mode, assuming that $K_1$ is a negative number, the absolute value of $K_1$ may be increased to insure that the operating set point is adequately increased as building load increases.

Figure 5A:
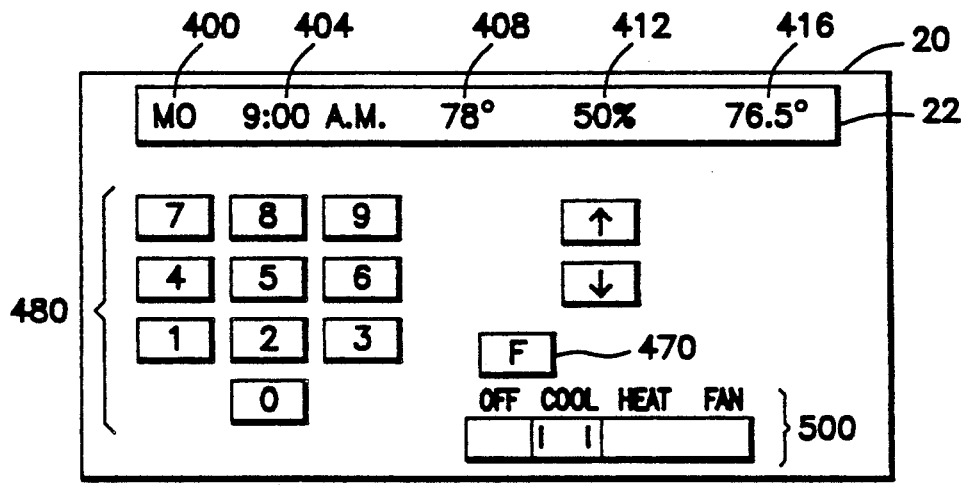
FIGS. 5A and 5B show a control panel for use in accordance with the present invention and such a control panel with an alternative display, respectively.
Figure 5B:
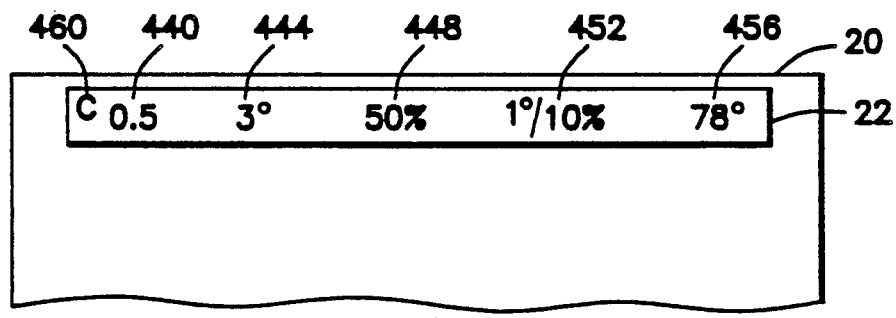

As shown in FIG. 5A, the control panel 20 includes a digital display 22 for displaying a day of the week 400, time 404, temperature 408, relatively humidity 412, and current operating set point 416. As shown in FIG. 5B, the display 22 may also be suitable for displaying comfort control information such as the building load 440, building load constant 444, relative humidity comparison constant 448, relative humidity multiplier constant 452, and selected temperature 456. For example, the second display having the second set of information may be accessed by a function key 470 on control panel 20.

The control panel 20 also has a set of input buttons 480 for setting the selected temperature or resetting other values as shown in FIG. 5A. Constant values for the cooling mode (indicated on the display in FIG. 5B at 460) or the heating mode may be reset by changing to the display shown in FIG. 5B and inputting the desired changes. Also shown in FIG. 5A is mode control 500 for placing the control system in heating, cooling, and other modes.

TABLE A

| Time | $T_p$ | $T_s$ | $T_o$ (°F.) | ΔT | $L_B$ | $RH_s$ (%) | S (°F.) |
|---|---|---|---|---|---|---|---|
| 6 am | 78 | 78 | 68 | −10 | 0 | 60 | 77 |
| 10 am | 78 | 77 | 77 | 0 | 0 | 50 | 78 |
| noon | 78 | 78 | 83 | 5 | .6 | 43 | 76.3 |
| 3 pm | 78 | 76 | 88 | 12 | 1.0 | 45 | 75.5 |
| 6 pm | 78 | 76 | 80 | 4 | .5 | 35 | 78 |
| midnight | 78 | 78 | 73 | −5 | 0 | 45 | 78.5 |

(MODE:COOLING)

What is claimed is:

1. A comfort control system for modifying the operating temperature for an environment to be controlled comprising:
   (a) an input means for inputting a selected temperature of the environment and providing an electrical signal indicative of the selected temperature to a microprocessor means;
   (b) temperature sensor means for sensing the temperature in the environment to be controlled and supplying an electrical signal indicative of said sensed temperature to said microprocessor means;
   (c) relative humidity sensor means for sensing the relative humidity in the environment to be controlled and supplying an electrical signal indicative of said sensed relative humidity to said microprocessor means;
   (d) building load determining means for sensing a characteristic indicative of the exterior building load on the environment to be controlled, approximating the building load from the sensed characteristic, and supplying an electrical signal indicative of said building load to said microprocessor means; and
   (e) microprocessor means electrically interconnected with the input means, temperature sensor means, relative humidity sensor means, and building load determining means and under software control for:
      (i) calculating an operating temperature set point for the environment to be controlled based on a predetermined equation and derived from the electrical signals indicative of the selected temperature inputted from the input means, the temperature sensed by the temperature sensor means, the relative humidity sensed by the relative humidity sensor means, and the building load approximated by the building load determining means;
      (ii) comparing said operating temperature set point to the temperature sensed by the temperature sensor means, and
      (iii) generating a suitable control signal for an HVAC unit derived from the comparison between the calculated current operating temperature set point and the temperature sensed by the temperature sensor means.

2. A system in accordance with claim 1 wherein the microprocessor means comprises a central processing unit, a read only memory means for storing the software which controls the microprocessor means, and a random access memory means for storing the values from which the microprocessor means derives the current operating temperature set point.

3. A system in accordance claim 1 wherein the predetermined equation used by said microprocessor means for calculating the operating temperature set point is the following formula:

$$S = T_p - K_1 + (K_2 - RH_s)K_3$$

where S equals the operating temperature set point, $T_p$ indicates the selected temperature of the environment input at the input means, $L_b$ indicates the building load derived from the building load determining means, $RH_s$ indicates the relative humidity sensed by the relative humidity sensor means, and $K_1$, $K_2$, and $K_3$ indicate selected constants.

4. A system in accordance with claim 1 wherein the building load determining means comprises means for sensing the duty cycle of the control system.

5. A system in accordance claim 4 wherein the predetermined equation used by said microprocessor means for calculating the operating temperature set point is the following formula:

$$S = T_p - K_1 D + (K_2 - RH_s)K_3$$

where S equals the operating temperature set point, $T_p$ indicates the selected temperature of the environment input at the input means, D indicates the duty cycle, $RH_s$ indicates the relative humidity sensed by the relative humidity sensor means, and $K_1$, $K_2$, and $K_3$ indicate selected constants.

6. A system in accordance with claim 3 wherein the building load determining means comprises means for sensing the temperature outside the environment to be controlled.

7. A system in accordance with claim 6 wherein $L_b$ is calculated as the ratio of the difference between the temperature outside the environment to be controlled and the temperature inside the environment to be controlled divided by a constant value.

8. A system in accordance with claim 3 further comprising means for adjusting the constant values $K_1$, $K_2$, and $K_3$ used in the operating temperature set point calculation formula.

9. A method of controlling the comfort of a room or other environment comprising the steps of:
   (a) sensing the air temperature and relative humidity of the room or other environment to be controlled;
   (b) monitoring a characteristic of the room or other environment to be controlled which is indicative of the building load of the room or other environment to be controlled;
   (c) generating electrical signals corresponding to the sensed air temperature, sensed relative humidity, and building load derived from the building-load-indicative characteristic monitored;
   (d) accessing information indicative of the selected temperature of the room or other environment and constant values indicative of a modification of an operating set point selected as a result of the sensed relative humidity and the monitored building load-indicative characteristic;
   (e) calculating an operating temperature set point of the room or other environment to be controlled in accordance with a calculation formula which incorporates a selected room temperature, the sensed relative humidity, the building load, and the accessed constant values;
   (f) comparing the calculated operating temperature set point with the sensed air temperature; and
   (g) generating a control signal for comfort control system dependent on the comparison of the calculated operating temperature set point and the sensed air temperature.

10. A method in accordance with claim 9 wherein the step of monitoring the load-indicating characteristics of the environment comprises the step of monitoring the duty cycle of the comfort control system.

11. A method in accordance with claim 9 wherein the step of monitoring the load-indicating characteristics of the environment comprises the step of sensing the temperature outside the room or other environment to be controlled.

12. A method in accordance with claim 9 wherein the step of calculating comprises the step of using the following calculation formula:

$$S = T_p - K_1 L_b + (K_2 - RH_s) K_3$$

where S equals the operating temperature set point, $T_p$ indicates the selected temperature input at the input means, $L_b$ indicates the building load derived from the characteristics monitored by the building load monitoring means, $RH_s$ indicates the relative humidity sensed by the relative humidity sensor means, and $K_1$, $K_2$, and $K_3$ indicate constants.

13. A method in accordance with claim 12 wherein $L_b$ equals the duty cycle of the comfort control system.

14. A method in accordance with claim 12 wherein $L_b$ is derived from the ratio of the difference between the indoor sensed temperature and the outdoor sensed temperature and a selected constant value.

* * * * *

UNITED STATES PATENT AND TRADEMARK OFFICE
CERTIFICATE OF CORRECTION

PATENT NO. : 5,105,366
DATED : April 14, 1992
INVENTOR(S) : Thomas J. Beckey

It is certified that error appears in the above-identified patent and that said Letters Patent is hereby corrected as shown below:

Column 3, line 6, insert --or-- after the word "set"

Column 7, line 47, insert --the-- after the word "with"

Column 8, line 2, "exceed" should read --exceeds--

Column 8, line 17, "fact" should read --factor--

Column 9, line 44, "inputted" should read --input--

Column 9, line 65, insert --with-- after the word "accordance"

Column 10, line 3, "$S=Tp-K_1+$" should read --$S=Tp-K_1L_b+$--

Signed and Sealed this

Twenty-fourth Day of August, 1993

Attest:

BRUCE LEHMAN

*Attesting Officer*   *Commissioner of Patents and Trademarks*